Dec. 17, 1940.  A. SCHMIDT, JR  2,225,355
ELECTRIC VALVE CONVERTING APPARATUS
Filed June 21, 1939
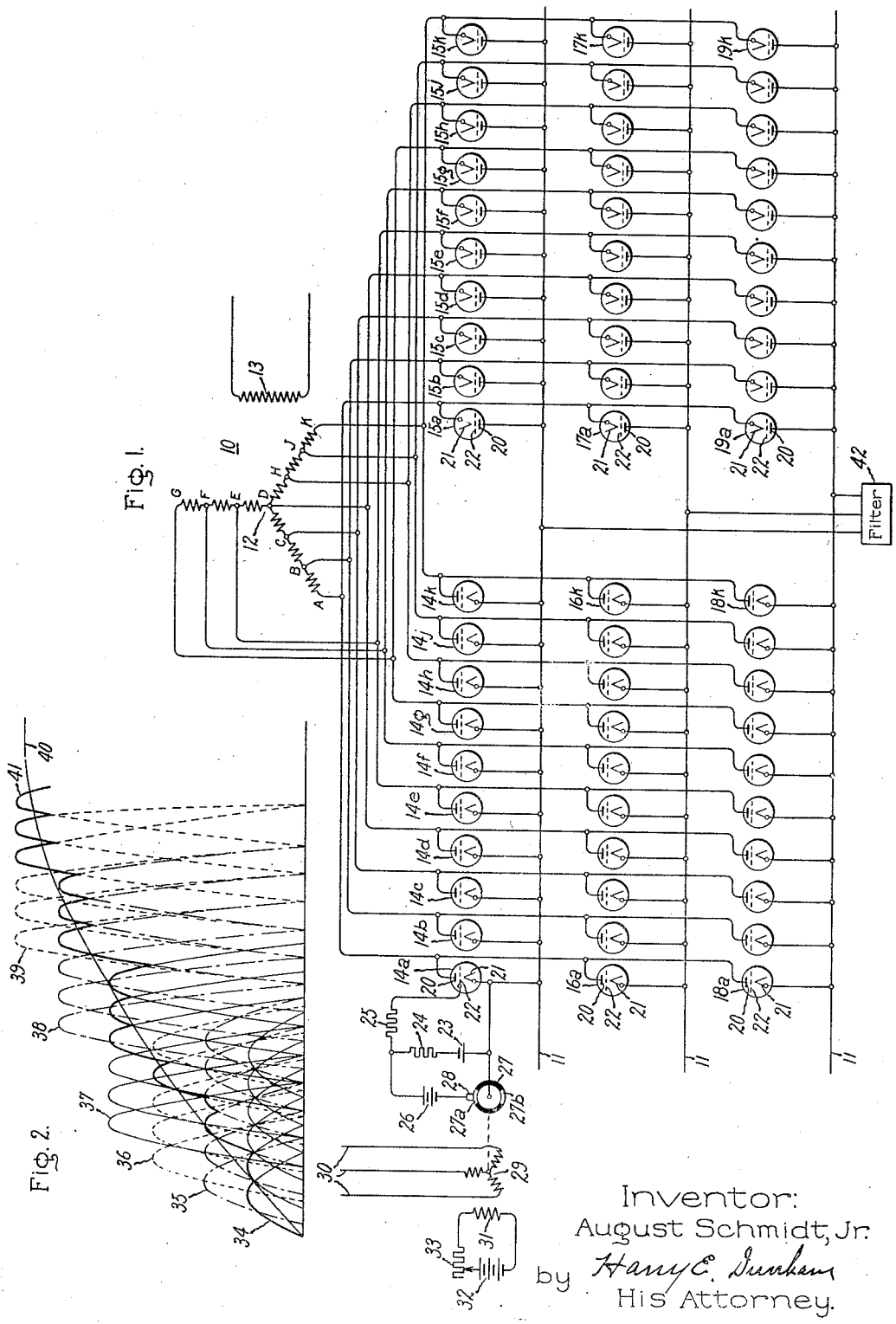
Inventor:
August Schmidt, Jr.
by Harry E. Dunham
His Attorney.

Patented Dec. 17, 1940

2,225,355

UNITED STATES PATENT OFFICE 2,225,355

ELECTRIC VALVE CONVERTING APPARATUS

August Schmidt, Jr., Niskayuna, N. Y., assignor to General Electric Company, a corporation of New York Application June 21, 1939, Serial No. 280,333

9 Claims. (Cl. 172—281)

My invention relates to electric valve converting apparatus and more particularly to such apparatus adapted to transmit energy between alternating current circuits of different frequencies.

It has long been recognized that it is desirable to utilize turbines for driving alternating current generators particularly when the generators can be directly coupled to the turbine. However, troublesome rotor vibrations are sometimes encountered with high speed turbine generators of a few poles particularly bi-polar generators. Such tendency to rotor vibration is eliminated if a large number of poles are used, but when such generators are directly connected to high speed turbines the frequency of the alternating current generated is in the neighborhood of 500 cycles per second, or more. In order to utilize satisfactorily this high frequency current in connection with the normal commercial frequency circuits of 60 cycles or thereabouts, it would be desirable to have an electronic frequency changer for converting the generated high frequency current to a lower, usable commercial frequency. It, furthermore, has been suggested heretofore to generate high frequency current by means of a direct connected turbine driven alternator, and to rectify and convert this high frequency current to a low frequency current by means of electric valve frequency converting apparatus. Also heretofore there have been proposed a number of electric valve converting apparatus for transmitting energy between alternating current circuits of different frequencies. The majority of these converting apparatus of the prior art fall into two general classes: Those in which the current is commutated between the several electric valves by the E. M. F. of the input circuit and those in which the current is commutated between the several valves by the E. M. F. of the output circuit. My invention relates to electric valve converting apparatus of the former class for interconnecting a high frequency generator with a low frequency load circuit in which commutating difficulties are minimized by utilizing a number of input waves to form a single output wave. Electric valve converting apparatus of this class inherently are limited to the transmission of energy from a higher frequency circuit to a lower frequency circuit, the successive half waves of alternating potential of the output circuit comprising a number of half waves of the input circuit, either successive in case the input circuit is single phase or overlapping in case the input circuit is polyphase. The arrangements of the prior art have been subject to the disadvantage that it has been necessary to employ apparatus which has been complicated in construction and arrangement. In view of these facts it has become apparent that there is a decided need for frequency converting apparatus for performing the above-mentioned functions in a precise and reliable manner without involving expensive or complicated equipment.

It is an object of my invention to overcome the disadvantages above noted in connection with apparatus for converting the high frequency alternating current output of a high-speed prime mover driven generator to a lower frequency alternating current in the commercial frequency range.

It is a further object of my invention to provide an improved electric valve converting apparatus for transmitting energy between alternating current circuits of different frequencies in which the alternating current delivered to the load circuit may be given any predetermined wave form.

Still another object of my invention is to provide a frequency converting system wherein a plurality of cycles of input alternating potential are used to build up a cycle of alternating output voltage and wherein the ratio of frequencies is constant and of such value that an integral number of cycles of input frequency will produce a lesser integral number of cycles of output frequency.

It is another object of my invention to provide a frequency converting system wherein a high frequency generator is constructed and arranged to provide a plurality of cycles of alternating potentials of differing magnitudes and phase which are utilized through the agency of electric valve means to provide an output voltage of a lower frequency.

In accordance with the illustrated embodiment of my invention I provide an electric valve converting system of the constant frequency ratio type wherein a high frequency alternating current generator supplies energy through an electric valve converting apparatus to a low frequency alternating current load circuit. A plurality of taps are provided on the polyphase winding of the generator to which the electric valve apparatus is connected so that a plurality of alternating current waves of a periodicity of the high frequency current generated and of varying magnitudes may be impressed upon the low frequency output circuit in such a manner by means of the electric valve devices as to approximate any predetermined wave form in the low frequency output circuit, for example, a sine wave.

For a better understanding of my invention reference may be had to the following description taken in connection with the accompanying drawing and its scope will be pointed out in the appended claims.

Fig. 1 of the accompanying drawing illustrates my invention as applied to an arrangement for transmitting energy from a polyphase, high frequency alternating current generator to a polyphase alternating current load circuit of much lower frequency, while Fig. 2 represents certain wave forms appearing in the arrangement shown in Fig. 1 to aid in the understanding of the invention.

Referring now to Fig. 1 of the drawing, there is illustrated one embodiment of my invention for transmitting energy from a three-phase high frequency alternating current generator 10 to a three-phase alternating current load circuit 11. The high frequency generator 10 is provided with a Y-connected armature winding 12 and a field winding 13, the latter being supplied from a source of direct current (not shown). Generator 10 is preferably driven by a direct connected high-speed turbine (not shown). The three phases of the generator armature winding 12 are provided with a plurality of winding sections in each phase for producing voltages of differing magnitudes and phase which may be separate sections or in the form as illustrated taps A, B, C, D, E, F, G, H, J and K. The taps A to K are connected to the anodes 20 of electric valves 14a to 14k, respectively. The cathodes 21 of the electric valves 14a to 14k are connected to one line of the polyphase alternating current load circuit 11. The anodes 20 of another group of electric valves 15a to 15k are connected to the same line of alternating current load circuit 11 as the cathodes 21 of the electric valves 14a to 14k, respectively. The cathodes 21 of electric valves 15a to 15k are connected to the taps A to K, respectively, of armature winding 12. In the same manner taps A to K of armature winding 12 are connected to the respective anodes 20 of valves 16a to 16k and 18a to 18k, and also to the respective cathodes 21 of valves 17a to 17k and 19a to 19k. The cathodes 21 of electric valves 16a to 16k and the anodes 20 of electric valves 17a to 17k are all connected to the second line of alternating current load circuit 11, while cathodes 21 of electric valves 18a to 18k and anodes 20 of electric valves 19a to 19k are all connected to the third line of alternating current load circuit 11. Each of the electric valves 14a to 19k, inclusive, is provided in addition to anode 20 and cathode 21, with a control electrode or grid 22. These electric valves may be of any of the several types well known in the art, although I prefer to use valves of the vapor electric discharge type. Although I have disclosed the electric valves 14a to 19k as being of the type wherein an anode, a cathode and a control electrode or grid are mounted in separate containers, it will, of course, occur to those skilled in the art that electric valves of the type wherein a plurality of anodes or control electrodes are mounted in a single container may equally well be used.

The grids or control electrodes 22 of the plurality of electric valves may be energized in any of the several well known manners for controlling the respective valves of the electric valve converting apparatus. A negative bias potential, relative to the potential of the cathodes 21, is continuously impressed on each of the control electrodes 22 of electric valves 14a to 19k, respectively, from a suitable source, such as battery 23, connected in series with the respective cathodes 21 and control electrodes 22 through suitable resistances 24 and 25. Each control electrode or grid 22 is also sequentially energized with a positive potential with respect to the associated cathode potential from a suitable source such as battery 26, through a segment 27a of a distributor 27 and the brush 28 thereof. A second segment 27b is provided on distributor 27 in order that the arrangement may be suitable to supply a reactive load without additional apparatus as will be described hereinafter. In the present embodiment distributor 27 is driven by a synchronous motor 29 energized from a suitable alternating current source 30, which may be connected to load circuit 11. Synchronous motor 29 as illustrated is provided with a field winding 31 supplied with direct current from battery 32 through a suitable resistance 33.

Although I have disclosed in Fig. 1 the grid circuit of only a single tube 14a it will, of course, be understood that a similar control is provided for each of the control electrodes 22 of each of the electric valves 14a to 19k, respectively. The length of the conducting segments 27a and 27b will, of course, vary among the respective distributors for the different electric valves in accordance with the particular portion of the output voltage wave which the respective valves are to transmit as will be later described. A separate distributor similar to distributor 27 will be provided for each of the electric valves, and these distributors may, when certain frequency ratios are desired, all be driven by a single synchronous motor 29 so long as the individual distributors are properly adjusted with respect to one another thereby to control the sequential excitation of the various control electrodes to obtain the desired frequency conversion.

A better understanding of the operation of the above described apparatus may be obtained by referring to Fig. 2 of the drawing. In Fig. 2 a plurality of polyphase alternating current potentials of the frequency of the output of generator 10 and of varying magnitudes are represented, respectively, by the curves 34, 35, 36, 37, 38 and 39. These curves represent the various relations of the voltages impressed on the different anodes of electric valves 14, 16 and 18. Curve 40 represents a portion of the predetermined alternating voltage wave which it is desired to approximate in the output circuit 11. Alternating voltages represented by curve 34 are of the lowest magnitude and may be obtained across a single section of the armature winding 12 for example, across taps CD, HD and ED. Although armature winding 12 is shown as a three-phase winding, actually six-phase alternating potentials, as shown by curves 34 to 39, are obtained from this winding, since the electric valves are connected so that the reverse potentials DE, DC and DH may be obtained as well as potentials CD, HD and ED. Hence the alternating potentials represented by curve 34 of Fig. 2 are actually six-phase and displaced from one another by sixty electrical degrees. Alternating potentials of somewhat greater magnitude are represented by curve 35 and may be obtained, for example, from taps CH, HE and EC, as well as the corresponding reversed potentials so that six-phase alternating potentials corresponding to curve 35 are obtained. As is obvious to one skilled in the art, these potentials are thirty degrees out of phase with respect to the potentials illustrated by curve 34 and the magnitude of these potentials is greater by the square root of three than the potentials illustrated by curve 34. In the same manner, six-phase alternating current potentials of the frequency of the output of generator 10, corresponding to curves 36, 37, 38 and 39 of Fig. 2, may be obtained from taps BH, BJ, AJ and AK, respectively, as well as from the corresponding taps for the other five phases.

The control electrodes 22 of the respective valves 14a to 19k are energized so as to cause the respective valves to conduct in proper sequence. In this manner an output voltage, represented by the heavy solid line 41 of Fig. 2, interconnecting various portions of curves 34 to 39, respectively, is made to appear across the alternating load current circuit 11. It will be observed that the first pulse of curve 41 made up of the lowest magnitude of potentials obtainable from armature winding 12 and represented by curve 34, requires that the particular electric valve allowing this portion of the output voltage to be impressed on the load circuit 11 must conduct for a considerably longer period of time than the particular electric valve which produces the second voltage pulse of curve 41. A study of this curve shows that varying portions of the different cycles of input voltage with respect to time are used to build up the output voltage wave and it is of course necessary that the respective tubes across which these varying portions of the cycles of the input voltage appear must be made conductive for varying lengths of time. For this reason the position of conducting segments 27a and 27b will vary among the different distributors 27 for the different valves 14a to 19k respectively. Thus, by combining these voltage impulses obtained from across the various taps of generator winding 12 in a predetermined manner with the aid of electric valves 14a to 19k, an alternating potential approximating curve 40 is obtained across the output circuit 11. By means of a suitable filter shown schematically at 42 in Fig. 1 the higher harmonics in alternating potential wave 41 may be eliminated so as to approach the wave form of curve 41 which is preferably sinusoidal although any predetermined wave form may be obtained. It will of course, be understood by those skilled in the art that both the positive and negative half cycles of the output voltage are produced in the same manner as the portion of this voltage wave shown at 41 in Fig. 2. If the frequency converter is used to supply a reactive load it will, of course, be necessary during a portion of the alternating voltage cycle that power flow be reversed. For this reason a second segment 27b is provided on distributor 27 so that the same electric valve may be caused to conduct at a time corresponding to power flow from the low frequency to the high frequency system. By this arrangement the frequency converting apparatus may be used to supply a reactive load without additional auxiliary equipment. If the ratio of the input frequency to output frequency is an integer, then the same tube will supply the same portion of the output voltage for each cycle of output voltage. In such an arrangement only two segments are necessary and distributor 27 and similar distributors for each of the valves 14a to 19k having conducting segments 27a and 27b may be driven by a single synchronous motor 29 supplied with alternating current from load circuit 11. However, if the ratio of input to output frequency is not an integer, it will be necessary to provide as many pairs of conducting segments 27a and 27b as the minimum number of cycles of voltage of output frequency that can be exactly made up from a larger integral number of cycles of voltage of input frequency. When such a frequency ratio exists the distributor 27 will make one revolution for each of the minimum number of the integral cycles of output frequency that can be produced from an integral number of cycles of the input frequency. It will of course, be understood by those skilled in the art that it is merely necessary to control the sequential energization of the various control electrodes 22 so that the electric valve converting apparatus may allow the high frequency current impulses represented by curves 34 to 39, respectively, to be impressed upon the load circuit 11 in such a manner as to approach an alternating current wave of the desired frequency and predetermined wave form. For any particular apparatus as disclosed in Fig. 1 it will of course be understood that a constant ratio of frequency between input and output circuits will be maintained.

Although I have illustrated my invention as applied to an arrangement for transmitting energy from a three-phase high frequency alternating current generator to a three-phase alternating current load circuit, it will be apparent to those skilled in the art that it is equally applicable to any polyphase arrangement, the approximation of the output wave form to a sine wave increasing with an increase in the number of phases in the supply circuit.

While I have described a particular embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In an electric valve frequency changing system an alternating current source comprising a high frequency generator, an armature winding for said generator provided with a plurality of taps including a neutral tap, a low frequency alternating current load circuit, a converting apparatus including a plurality of electric valves reversely connected with respect to said taps and each provided with a control electrode for transmitting energy from said taps on said armature winding to said load circuit, and means for sequentially energizing the control electrodes of said valves with periodic potentials so that a low frequency alternating potential of predetermined wave form is supplied to said load circuit.

2. Apparatus for transmitting energy between alternating current circuits of different frequencies, one of said circuits including a polyphase inductive winding having a plurality of taps per phase, a plurality of electric valves interconnecting said taps on said generator winding with said other alternating current circuit of different frequency, and means for rendering said valves conductive in a predetermined sequence to impress selectively on said other alternating current circuit the potentials appearing between any pair of said taps to supply an alternating potential of a predetermined wave form to said other alternating current circuit.

3. Apparatus for transmitting energy from a higher frequency alternating current circuit to a lower frequency alternating current circuit comprising a high frequency generator including a polyphase winding provided with a plurality of taps per phase, a plurality of electric valves interconnecting the taps on said generator winding with said lower frequency alternating current circuit, and means for rendering said valves conductive in a predetermined sequence so that the voltages appearing between any pair of said taps may be impressed sequentially on said alternating current circuit of lower frequency to supply thereto alternating potentials of substantially sinusoidal wave form.

4. Apparatus for transmitting energy from a high frequency alternating current generator to an alternating current load circuit of low frequency comprising a polyphase winding for said high frequency generator provided with a plurality of taps including a neutral tap, a plurality of electric valves for interconnecting the taps on said generator winding with said load circuit, and means for sequentially rendering conductive the valves associated with said taps so that the alternating voltages of various magnitudes and phase position appearing between any of said taps may be impressed sequentially on said low frequency load circuit to supply thereto an alternating potential of approximately sine wave form.

5. In combination a high frequency alternating current circuit including a polyphase winding provided with a plurality of taps per phase, an alternating current load circuit of low frequency, a plurality of electric valves interconnecting the taps of said winding with said load circuit, and means for rendering said valves conductive in a predetermined sequence to transmit to said low frequency load circuit an alternating potential of substantially sine wave form, each cycle of said low frequency alternating potential comprising an integral number of cycles of said high frequency generator output voltage.

6. Apparatus for transmitting energy between alternating current circuits of different frequencies, one of said circuits comprising a high frequency generator including a polyphase armature winding provided with a plurality of winding sections in each phase, a plurality of electric discharge valves interconnecting said winding sections with said other alternating current circuit of different frequency, and means for rendering said valves conductive in a predetermined sequence to impress sequentially on the other of said alternating current circuits the potentials appearing across different combinations of said winding sections to supply thereto an alternating potential of a predetermined wave form.

7. In an electric valve converting system, a source of high frequency alternating current including a polyphase inductive winding provided with a plurality of terminals including a neutral terminal, a low frequency alternating current load circuit, electric discharge valves associated with said terminals, and a control circuit for controlling the conductivities of said valves so that the voltage appearing between any pair of said terminals may be impressed upon said low frequency alternating current circuit to produce a low frequency alternating current potential of predetermined wave form.

8. Apparatus for transmitting energy from a high frequency alternating current circuit to an alternating current load circuit of low frequency comprising a polyphase inductive winding associated with said high frequency circuit including a plurality of taps and a neutral tap, a plurality of electric valves for interconnecting the taps including the neutral tap of said winding with said load circuit, and means for sequentially rendering conductive the valves associated with said taps so that the alternating voltages of various magnitudes and phase positions apearing between any pair of taps of said winding may be impressed on said low frequency load circuit to produce a low frequency alternating current potential of approximately sine wave form.

9. In an electric valve converting system, a polyphase high frequency alternating current supply including an inductive winding, an alternating current load circuit, said inductive winding having a plurality of taps per phase dividing each of said phase windings into a plurality of winding sections, a pair of reversely connected valves associated with each of said taps and interconnecting said inductive winding with said load circuit, and means for rendering said valves conductive selectively to impress the voltages appearing between any pair of taps of said inductive winding on said load circuit to produce a low frequency alternating potential of predetermined wave form.

AUGUST SCHMIDT, Jr.